United States Patent
Jung et al.

(10) Patent No.: US 10,705,593 B2
(45) Date of Patent: Jul. 7, 2020

(54) METHOD AND APPARATUS FOR POWER MANAGEMENT

(71) Applicant: Samsung Electronics Co., Ltd., Gyeonggi-do (KR)

(72) Inventors: Kuchul Jung, Seoul (KR); Kisun Lee, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/246,636

(22) Filed: Jan. 14, 2019

(65) Prior Publication Data

US 2019/0146574 A1    May 16, 2019

Related U.S. Application Data

(63) Continuation of application No. 14/799,698, filed on Jul. 15, 2015, now abandoned.

(30) Foreign Application Priority Data

Jul. 16, 2014    (KR) .................. 10-2014-0089593

(51) Int. Cl.
| | | |
|---|---|---|
| *G06F 1/3287* | (2019.01) | |
| *G06F 1/26* | (2006.01) | |
| *G06F 1/3212* | (2019.01) | |
| *H04B 1/16* | (2006.01) | |
| *G06F 1/30* | (2006.01) | |
| *G06F 11/07* | (2006.01) | |

(52) U.S. Cl.
CPC ............ *G06F 1/3287* (2013.01); *G06F 1/263* (2013.01); *G06F 1/30* (2013.01); *G06F 1/3212* (2013.01); *G06F 11/0757* (2013.01); *H04B 1/1615* (2013.01)

(58) Field of Classification Search
CPC .......... G06F 1/3287; G06F 1/263; G06F 1/30; G06F 1/3212; G06F 11/0757; H04B 1/1615
See application file for complete search history.

(56) References Cited

U.S. PATENT DOCUMENTS

| | | |
|---|---|---|
| 4,868,817 A | 9/1989 | Shigihara |
| 5,191,277 A | 3/1993 | Ishikura et al. |
| 5,230,074 A * | 7/1993 | Canova, Jr. ........... G06F 1/1613 714/14 |

(Continued)

FOREIGN PATENT DOCUMENTS

| | | |
|---|---|---|
| EP | 0 943 980 A2 | 9/1999 |
| EP | 1 744 439 A2 | 1/2007 |
| EP | 2 665 339 A1 | 11/2013 |

*Primary Examiner* — Jaweed A Abbaszadeh
*Assistant Examiner* — Gayathri Sampath
(74) *Attorney, Agent, or Firm* — Cha & Reiter, LLC.

(57) ABSTRACT

An apparatus is provided comprising a system including one or more electronic components; a power input unit arranged to supply power to the system; and a power management module configured to: detect whether the system is in an abnormal state, and in response to detecting that the system is in the abnormal state, adjust at least one of (i) power supplied from a battery to the system, (ii) the power supplied from the power input unit to the system, and (iii) power supplied from the power input unit to the battery.

17 Claims, 8 Drawing Sheets

(56) References Cited

U.S. PATENT DOCUMENTS

| | | | |
|---|---|---|---|
| 6,269,450 B1 | 7/2001 | Iwata et al. | |
| 2003/0154421 A1* | 8/2003 | Abe | G06F 1/266 714/2 |
| 2004/0263123 A1 | 12/2004 | Breen et al. | |
| 2005/0253560 A1 | 11/2005 | Popescu-Stanesti et al. | |
| 2006/0181244 A1 | 8/2006 | Luo et al. | |
| 2007/0002510 A1 | 1/2007 | Baurle et al. | |
| 2008/0150488 A1* | 6/2008 | Lu | H02J 7/0031 320/134 |
| 2009/0251108 A1 | 10/2009 | Chao et al. | |
| 2010/0164437 A1 | 7/2010 | McKinley et al. | |
| 2010/0174417 A1 | 7/2010 | Iida et al. | |
| 2010/0283431 A1 | 11/2010 | Kano | |
| 2011/0057620 A1* | 3/2011 | Tsai | H02J 7/0031 320/134 |
| 2011/0156636 A1 | 6/2011 | Kim | |
| 2011/0305926 A1* | 12/2011 | Kim | H02J 7/0031 429/7 |
| 2012/0117395 A1 | 5/2012 | Akiyama | |
| 2013/0093389 A1 | 4/2013 | Partovi | |
| 2013/0200847 A1* | 8/2013 | Kurokawa | H02J 7/0031 320/112 |
| 2013/0310997 A1 | 11/2013 | Takahashi et al. | |

* cited by examiner

METHOD AND APPARATUS FOR POWER MANAGEMENT

CLAIM OF PRIORITY

This application is a Continuation of U.S. patent application Ser. No. 14/799,698 filed on Jul. 15, 2015 which claims the benefit under 35 U.S.C. § 119(a) of a Korean patent application filed on Jul. 16, 2014, in the Korean Intellectual Property Office and assigned Serial No. 10-2014-0089593, the entire disclosure of which is hereby incorporated by reference.

BACKGROUND

Field of the Invention

The present disclosure relates to electronic devices, and more particularly to a method and apparatus for power management.

Description of the Related Art

In general, electronic devices such as a smart phone, tablet Personal Computer (PC), Portable Multimedia Player (PMP), Personal Digital Assistant (PDA), Laptop PC, and wearable device such as a wrist watch and a Head-Mounted Display (HMD) include other various functions (e.g., Social Network Service (SNS), Internet surfing, multimedia reproduction, and picture and moving picture photographing and reproduction) as well as a phone function. As a portable electronic device includes various functions, a current consuming in a processor increases.

As a current consuming in a processor of an electronic device having various functions increases, a problem exists that much heat occurs at the inside of the electronic device.

SUMMARY

According to aspects of the disclosure, an apparatus is provided comprising a system including one or more electronic components; a power input unit arranged to supply power to the system; and a power management module configured to: detect whether the system is in an abnormal state, and in response to detecting that the system is in the abnormal state, adjust at least one of (i) power supplied from a battery to the system, (ii) the power supplied from the power input unit to the system, and (iii) power supplied from the power input unit to the battery.

According to aspects of the disclosure, a method is provided comprising: detecting whether a battery is being charged; when the battery is being charged, detecting whether a system is in an abnormal state; and if the system is in the abnormal state, adjusting by a power management module, at least one of (i) power supplied from the battery to the system, (ii) the power supplied from a power input unit to the system, and (iii) power supplied from the power input unit to the battery.

BRIEF DESCRIPTION OF THE DRAWINGS

The above features and advantages of the present disclosure will be more apparent from the following detailed description in conjunction with the accompanying drawings, in which.

DETAILED DESCRIPTION

Hereinafter, various exemplary embodiments of the present disclosure are described in detail with reference to the accompanying drawings. The same reference numbers are used throughout the drawings to refer to the same or like parts. Detailed descriptions of well-known functions and structures incorporated herein may be omitted to avoid obscuring the subject matter of the present disclosure. While the present disclosure may be embodied in many different forms, specific embodiments of the present disclosure are shown in drawings and are described herein in detail, with the understanding that the present disclosure is to be considered as an exemplification of the principles of the disclosure and is not intended to limit the disclosure to any specific examples that might be provided.

Figure 1:
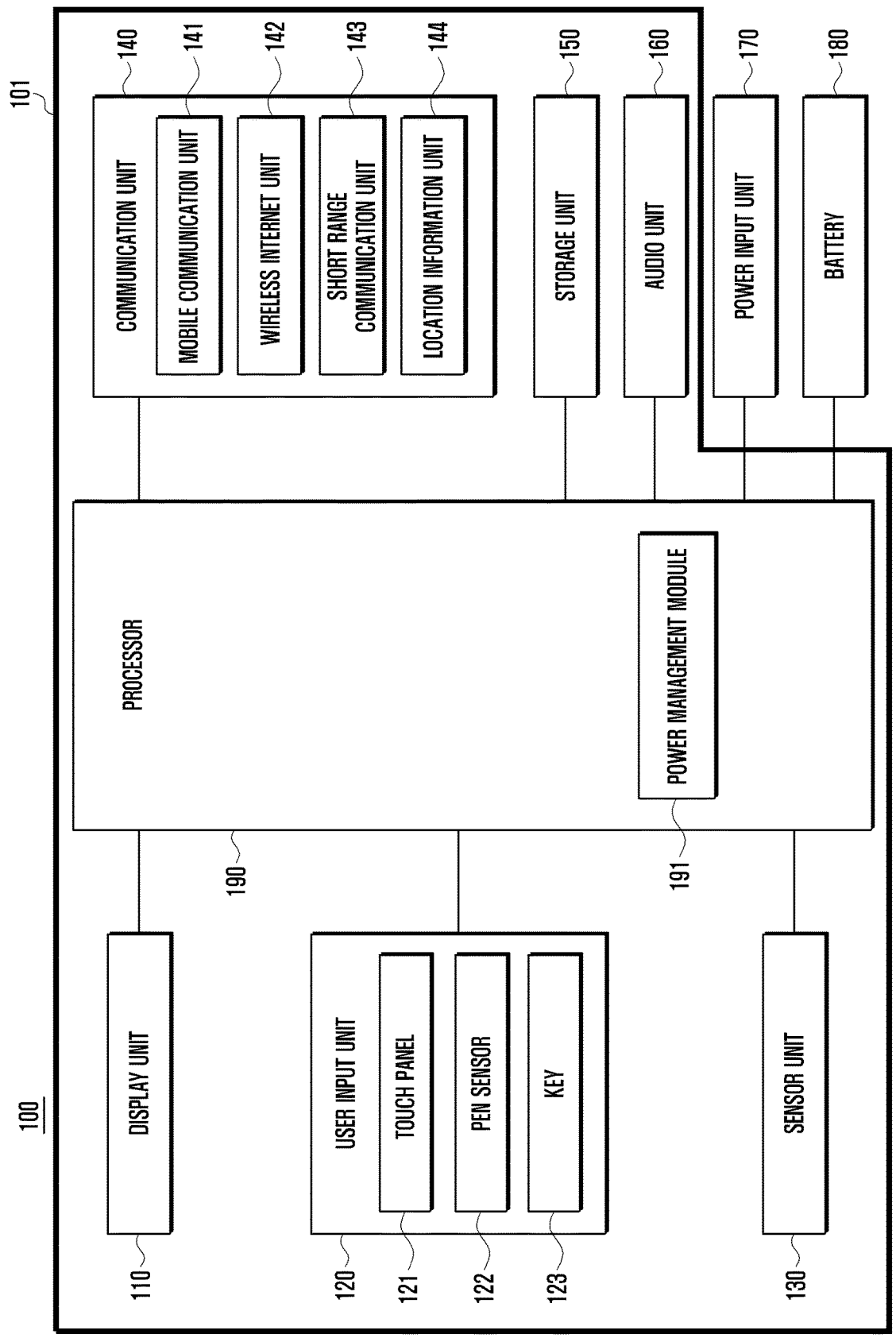
FIG. 1 is a block diagram of an example of an electronic device, according to aspects of the present disclosure.

FIG. 1 is a block diagram of an example of an electronic device 100, according to aspects of the present disclosure.

The electronic device 100 may include a display unit 110, user input unit 120, sensor unit 130, communication unit 140, storage unit 150, audio unit 160, power input unit 170, battery 180, and processor 190.

The display unit 110 may include a panel, hologram device, or projector. For example, the panel may be a Liquid Crystal Display (LCD) or an Active-Matrix Organic Light-Emitting Diode (AM-OLED). The panel may be implemented with, for example a flexible, transparent, or wearable method. The panel may be formed in a module with a touch panel 121. The hologram device may show a stereoscopic image in the air using interference of light. The projector may project light on a screen to display an image. According to aspects of the present disclosure, the display unit 110 may further include a control circuit for controlling a panel, hologram device, or projector.

The user input unit 120 may include a touch panel 121, pen sensor 122, and home key 123. For example, the touch panel 121 may recognize a touch input with at least one method of a capacitive, resistive, infrared ray, or ultrasonic wave method. The touch panel 121 may further include a control circuit. When the touch panel 121 is a capacitive type touch panel, the touch panel 121 may perform a physical contact or proximity recognition. The touch panel 121 may further include a tactile layer. In this case, the touch panel 121 may provide a haptic reaction to the user.

For example, the pen sensor 122 may be implemented using the touch panel 121 or a separate recognition sheet. The home key 123 may include, for example a physical button, an optical key, or a keypad.

According to aspects of the present disclosure, the electronic device 100 may receive a user input from an external device (e.g., a computer or a server) connected to the communication unit 140 using the communication unit 140.

The sensor unit 130 may measure a physical quantity or detect an operation state of the electronic device 100 and convert measured or detected information to an electric signal. The sensor unit 130 may include at least one of, for example a gesture sensor, gyro sensor, atmospheric pressure sensor, magnetic sensor, acceleration sensor, grip sensor, proximity sensor, color sensor (e.g., Red, Green, and Blue (RGB) sensor), bio sensor, temperature/humidity sensor, illumination sensor, or Ultra Violet (UV) sensor. Additionally or alternatively, the sensor unit 130 may include an E-nose sensor, electromyography sensor (EMG sensor), electroencephalogram sensor (EEG sensor), electrocardiogram sensor (ECG sensor), Infrared (IR) sensor, iris sensor or fingerprint sensor, or geomagnetic field sensor. The sensor unit 130 may further include a control circuit that controls at least one sensor belonging to the inside thereof.

The communication unit 140 may perform data transmission and reception in communication between the electronic device 100 and other electronic devices connected via a network. According to aspects of the present disclosure, the communication unit 140 may include a mobile communication unit 141, wireless Internet unit 142, short range communication unit 143, and location information unit 144.

The mobile communication unit 141 may provide audio dedicated communication, audiovisual communication, a text message service, or an Internet service through a communication network (e.g., Long Term Evolution (LTE), LTE-A, Code Division Multiple Access (CDMA), Wideband Code Division Multiple Access (WCDMA), Universal Mobile Telephone System (UMTS), Wireless Broadband Internet (WiBro), or Global System for Mobile Communication (GSM)). For example, the mobile communication unit 141 may perform identification and authentication of an electronic device within a communication network using a subscriber identity module (e.g., SIM card). According to aspects of the present disclosure, the mobile communication unit 141 may perform at least a partial function of functions in which the processor 190 may provide. For example, the mobile communication unit 141 may perform at least a portion of a multimedia control function.

According to aspects of the present disclosure, the mobile communication unit 141 may include a Communication Processor (CP). For example, the mobile communication unit 141 may be implemented with a System on Chip (SoC). The mobile communication unit 141 (e.g., communication processor) is formed with an element separate from the processor 190, but the processor 190 may include the mobile communication unit 141.

According to aspects of the present disclosure, the processor 190 or the mobile communication unit 141 (e.g., a communication processor) may load and process an instruction or data received from the storage unit 150 (e.g., a nonvolatile memory) connected thereto or at least one of other elements in a volatile memory. Further, the processor 190 or the mobile communication unit 141 may store data received from at least one of other elements or generated by at least one of other elements at the storage unit 150 (e.g., a nonvolatile memory).

For example, the wireless Internet unit 142, short range communication unit 143, or location information unit 144 each may include a processor for processing data transmitted and received through a corresponding module.

The mobile communication unit 141, wireless Internet unit 142, short range communication unit 143, or location information unit 144 are each illustrated as a separate block, but according to aspects of the present disclosure, at least a portion (e.g., two or more) of the mobile communication unit 141, wireless Internet unit 142, short range communication unit 143, or location information unit 144 may be included within one integrated chip IC or IC package. For example, at least a portion of processors corresponding to each of the mobile communication unit 141, wireless Internet unit 142, short range communication unit 143, or location information unit 144 may be implemented with a SoC.

The communication unit 140 may perform transmission and reception of data and transmission and reception of an RF signal through an RF module. For example, the RF module may include a transceiver, Power Amp Module (PAM), frequency filter, or Low Noise Amplifier (LNA). Further, the RF module may further include a component, for example, a conductor or a conductive wire that transmits and receives electromagnetic waves on free space in wireless communication. By sharing one RF module, the mobile communication unit 141, wireless Internet unit 142, short range communication unit 143, or location information unit 144 may transmit and receive an RF signal. According to aspects of the present disclosure, at least one of the mobile communication unit 141, wireless Internet unit 142, short range communication unit 143, or location information unit 144 may perform transmission and reception of an RF signal through a separate RF module.

The wireless Internet unit 142 performs a function of accessing to wireless Internet. As wireless Internet technology, Wireless LAN (WLAN)(Wi-Fi), Wireless broadband (Wibro), World Interoperability for Microwave Access (Wimax), and High Speed Downlink Packet Access (HSDPA) may be used.

The short range communication unit 143 performs a function of short range communication. As short range communication technology, Bluetooth, Radio Frequency Identification (RFID), Infrared Data Association (IrDA), Ultra Wideband (UWB), and ZigBee may be used.

The location information unit 144 performs a function of acquiring or determining a location of the electronic device 100. The location information unit 144 may acquire location information using a Global Navigation Satellite System (GNSS). Here, the GNSS is a term using for describing wireless navigation satellite systems in which predetermined types of wireless navigation receivers send reference signals that can determine a location thereof at a surface of the earth or a periphery of a surface of the earth by revolving the earth. The GNSS may include a Global Position System (GPS) operating in US, Galileo operating in Europe, Global Orbiting Navigational Satellite System (GLONASS) operating in Russia, COMPASS operating in China, and Quasi-Zenith Satellite System (QZSS) operating in Japan.

Additionally, the communication unit 140 may include a network interface (e.g. a Local Area Network (LAN) card) or a modem that connects the electronic device 100 to a network (e.g. Internet, a LAN, a Wire Area Network (WAN), a telecommunication network, a cellular network, a satellite network, or a Plain Old Telephone Service (POTS).

The storage unit 150 may include at least one of an internal memory and an external memory.

The internal memory may include at least one of, for example a volatile memory (e.g., a Dynamic RAM (DRAM), Static RAM (SRAM), and Synchronous Dynamic RAM (SDRAM)), non-volatile memory (e.g., a One Time Programmable ROM (OTPROM), Programmable ROM (PROM), Erasable and Programmable ROM (EPROM), Electrically Erasable and Programmable ROM (EEPROM), mask ROM, and flash ROM), Hard Disk Drive (HDD), or Solid State Drive (SSD).

According to aspects of the present disclosure, the processor 190 may load and process an instruction or data received from at least one of other elements or a nonvolatile memory in a volatile memory. Further, the processor 190 may store data received from another element or generated data in the nonvolatile memory.

The external memory may include at least one of a Compact Flash (CF), Secure Digital (SD), Micro Secure Digital (Micro-SD), Mini Secure Digital (Mini-SD), extreme Digital (xD), or a memory stick.

The storage unit 150 may store an application program for operation of an operation system and an application that control a resource of the electronic device 100. The operation system may include a kernel, middleware, and an Application Programming Interface (API). For example, as an operation system, Android, iOS, Windows, Symbian, Tizen, or Bada may be used.

The storage unit 150 may store an instruction or data received from the processor 190 or other elements (e.g., the display unit 110, user input unit 120, sensor unit 130, and communication unit 140) or generated by the processor 190 or other elements. The storage unit 150 may include programming modules such as a kernel, middleware, an API, or an application. The foregoing respective programming modules may be formed with software, firmware, hardware, or a combination of at least two thereof.

The kernel may control or manage system resources (e.g., a bus, the processor 190, or the storage unit 150) used for executing an operation or a function implemented in the remaining programming modules, the middleware, the API, or the application. Further, the kernel may provide an interface that can control or manage by accessing to an individual constituent element of the electronic device 100 in the middleware, API, or application.

The middleware may perform an intermediary function that enables the API or the application to give and receive data by communicating with the kernel. Further, the middleware may control (e.g., schedule or load balance) a work request received from the application using, for example a method of aligning a priority that can use a system resource (e.g., the bus, processor 190, or storage unit 150) of the electronic device 100 to at least one of the applications.

The API is an interface that enables the application to control a function in which the kernel or the middleware provides and may include, for example at least one interface or function (e.g., instruction) for file control, window control, image processing, or text control.

According to aspects of the present disclosure, the application may include an SMS/MMS application, e-mail application, calendar application, alarm application, health care application (e.g., application that measures an exercise amount or blood sugar), or environment information application (e.g., application that provides atmospheric pressure, humidity, or temperature information).

The audio unit 160 may interactively convert a sound and an electronic signal. For example, the audio unit 160 may process sound information input or output through a speaker, receiver, earphone, or microphone.

A power supply device (e.g., a Travel Adapter (TA) or a Travel Charger (TC) that converts AC power to DC power) may be coupled to the power input unit 170. An external wire or wireless charger may be coupled to the power input unit 170. The power input unit 170 according to the present example may have a separate interface specification distinguished from an interface specification (e.g., 20 pin interface, micro Universal Serial Bus (USB) interface) of a TA (hereinafter, wire charger) generally used in a conventional mobile terminal. The power input unit 170 may supply power input from the power supply device to the electronic device 100.

The battery 180 may store or generate electricity and supply power to the electronic device 100 using the stored or generated electricity. The battery 180 may include, for example, a rechargeable battery or a solar battery.

By driving an operation system and application program, the processor 190 may control a plurality of hardware and software components (e.g., the display unit 110, user input unit 120, sensor unit 130, communication unit 140, and storage unit 150) coupled thereto and perform various data processing and calculation including multimedia data. For example, the processor 190 may be implemented with a SoC. According to aspects of the present disclosure, the processor 190 may further include a Graphic Processing Unit (GPU). According to aspects of the present disclosure, the processor 190 may be an Application Processor (AP) or a Communication Processor (CP). According to aspects of the present disclosure, the processor 190 may receive an instruction from the foregoing other elements (e.g., the display unit 110, user input unit 120, sensor unit 130, communication unit 140, and storage unit 150) through a bus, decode the received instruction, and execute calculation or data processing according to the decoded instruction.

The processor 190 may include a power management module 191. The power management module 191 may the supply of power to the electronic device 100 and/or the battery 180. For example, the power management module 191 may include a Power Management Integrated Circuit (PMIC) and a charger Integrated Circuit (IC). For example, the PMIC may be mounted within an IC or a SoC semiconductor. A charging method may be classified into a wired method and a wireless method. The charge IC may charge a battery and prevent an overvoltage or an overcurrent from being injected from a charger. According to aspects of the present disclosure, the charge IC may include a charge IC for at least one of a wired charge method and a wireless charge method. The wireless charge method may include, for example a magnetic resonance method, magnetic induction method, or electromagnetic wave method and may add an additional circuit, for example a circuit such as a coil loop, resonant circuit, and rectifier for wireless charge.

According to aspects of the present disclosure, the power management module 191 is a separate module that is not included in the processor 190 and may operate on the electronic device 100.

The electronic device 100 according to the present example may receive a supply of power through the power input unit 170. When receiving a supply of power from an external power supply device through the power input unit 170, the power management module 191 may determine that the electronic device 100 is charging. When the electronic device 100 is charging, the power management module 191 may supply power to an internal circuit of the electronic device 100. According to aspects of the present disclosure, when the electronic device 100 is charging, the power management module 191 may supply power to the battery 180 and a system 101. The system 101 is described with reference to FIGS. 3 to 4 to be described later. The system 101 may be other elements of the electronic device 100, except for the battery 180. For example, the system 101 may be the display unit 110, user input unit 120, sensor unit 130, communication unit 140, storage unit 150, audio unit 160, or processor 190.

The power management module 191 may detect an abnormal operation of the system 101. An abnormal operation of the system 101 indicates that as the electronic device 100 or the processor 190 does not normally operate with an unknown reason, the electronic device 100 or the processor 190 is in one state or a state that cannot use due to a circulation state, i.e., that the electronic device 100 or the processor 190 is in a lock-up state, and the power management module 191 may detect the abnormal operation.

The power management module 191, according to the present example, may detect that the electronic device 100 or the processor 190 is in a lock-up state using a watch-dog timer (not shown) included in the power management module 191.

The watch-dog timer is a circuit that monitors operation of the electronic device 100 or the processor 190 to detect an abnormal operation of the electronic device 100 or the processor 190, and for example when the electronic device 100 or the processor 190 does not terminate a processing within a predetermined time, the watch-dog timer may determine that the electronic device 100 or the processor 190 is in an abnormal state and output a signal related thereto.

For example, when the processor 190 does not determine a register bit in the power management module 191 for a predetermined time, the watch-dog timer may determine that the processor 190 is in a lock-up state.

When the system 101 is in an abnormal operation state, the power management module 191 may control power supplied through the power input unit 170 or power input and output to and from the battery 180.

According to aspects of the present disclosure, when the system 101 is in an abnormal operation state, the power management module 191 may block power supplied through the power input unit 170 to be supplied to the battery 180 and the system 101 and control power supplied through the battery 180 to supply to the system 101.

According to aspects of the present disclosure, when the system 101 is in an abnormal operation state, the power management module 191 may reduce power supplied through the power input unit 170 and power input and output to and from the battery 180 to predetermined power. When power supplied through the power input unit 170 and power input and output to and from the battery 180 is reduced, power consumption in the system 101 may be reduced.

The power management module 191, according to the present example, may detect whether the system 101 is overheating. The electronic device 100 or the processor 190 may include an element that can detect whether the system 101 is overheating. The power management module 191 may determine whether the system 101 is overheating by using a manual element or an active element such as a thermistor in which flow of electrons increase or reduces according to temperature increase of an element. Alternatively, the power management module 191 may determine whether the system 101 is overheating using a junction temperature therein. For example, when the system 101 is in an abnormal operation state, an exothermic phenomenon may occur.

When a temperature of the system 101 increases to a predetermined temperature or more, the power management module 191, according to the present example, may block power supplied through the power input unit 170 to be supplied to the battery 180 and the system 101 and control power supplied through the battery 180 to supply to the system 101.

When a temperature of the system 101 increases to a predetermined temperature or more, the power management module 191, according to the present example, may reduce power supplied through the power input unit 170 and power input and output to and from the battery 180 to predetermined power. When power supplied through the power input unit 170 and power input and output to and from the battery 180 is reduced, power consumption of the system 101 may be reduced. When power consumption of the system 101 is reduced, an exothermic phenomenon of the system 101 may be mitigated.

When a temperature of the system 101 increases to a predetermined temperature or more, the power management module 191, according to the present example, may block power supplied through the power input unit 170 to be supplied to the battery 180 and the system 101 and control power supplied through the battery 180 to supply to the system 101.

The power management module 191, according to the present example, may detect the level of current supplied from the power input unit 170 or the level of current input and output to and from the battery 180. For example, when the level current supplied from the power input unit 170 or a current input and output to and from the battery 180 is greater than or less than a predetermined current, the power management module 191 may control power supplied through the power input unit 170 and power supplied through the battery 180.

When a current supplied from the power input unit 170 or a current input and output to and from the battery 180 is greater than or less than a predetermined current, the power management module 191, according to the present example, may block power supplied through the power input unit 170 to be supplied to the battery 180 and the system 101 and control power supplied through the battery 180 to supply to the system 101.

Figure 2:
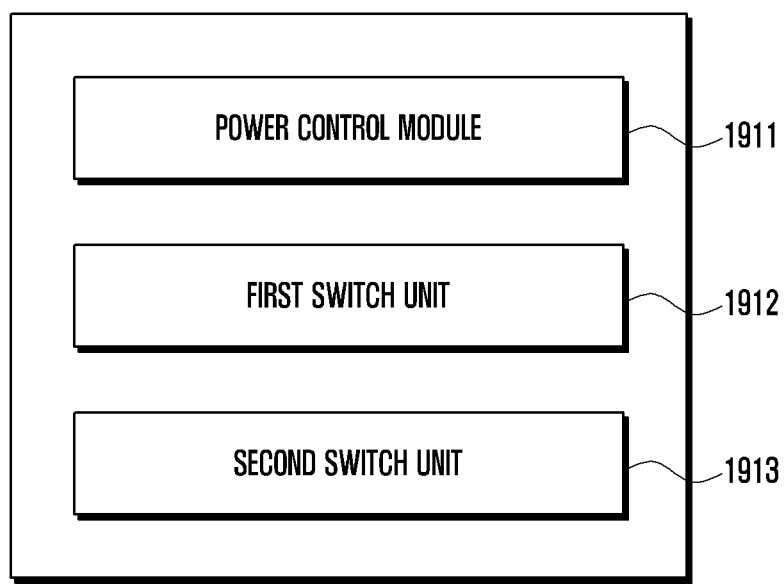
FIG. 2 is a block diagram of an example of a power management module, according to aspects of the present disclosure.

FIG. 2 is a block diagram of an example of a power management module 191 according to aspects of the present disclosure.

The power management module 191 may include a power control module 1911, first switch unit 1912, or second switch unit 1913. The power control module 1911 may control operation of the first switch unit 1912 or the second switch unit 1913. In some aspects, the power control module 1911 may include a watch-dog timer (not shown) that can detect an abnormal operation of the system 101. Additionally or alternatively, the power control module 1911 may include an element that can detect whether the electronic device 100 or the processor 190 is overheating. According to aspects of the disclosure, the power control module 1911 may detect the level of current provided by the power input unit 170 or the battery 180 through the first switch unit 1912 or the second switch unit 1913.

The first switch unit 1912 may adjust or control power output from the power input unit 170 to the system 101 or the battery 180 under the control of the power control module 1911. The first switch unit 1912 may detect the current fed from the power input unit 170 to the system 101 or the battery 180. Adjusting the power output from the power input unit 170 may include reducing the amount of power that is supplied by the power input unit 170 to the system 101 and/or completely cutting off the supply of power from the power input unit 170 to the system 101.

The second switch unit 1913 may adjust or control power output from the power input unit 170 to the battery 180 or power output from the battery 180 to the system 101 under the control of the power control module 1911. The second switch unit 1913 may detect a current input and output to and from the battery 180. Adjusting the power output from the power input unit 170 may include reducing the amount of power that is supplied by the power input unit 170 to the battery 180 and/or completely cutting off the supply of power from the power input unit 170 to the battery 180. Additionally or alternatively, adjusting the power output from the battery 180 to the system 101 may include reducing the amount of power that is supplied by the battery 180 to the system 101 and/or completely cutting off the supply of power from the battery 180 to the system 101.

According to aspects of the disclosure, as the power control module 1911 controls the first switch unit 1912 or the second switch unit 1913, the electronic device 100 may control power supplied to the system 101 or the battery 180.

Figure 3:
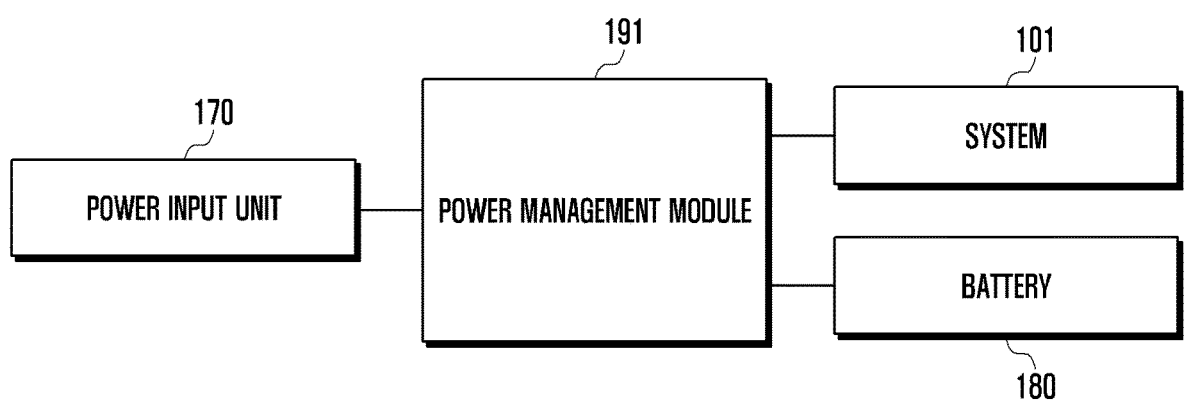
FIG. 3 is a block diagram of an example of a charge control device, according to aspects of the present disclosure.

FIG. 3 is a block diagram of an example of a charge control device, according to aspects of the present disclosure.

The charge control device of the electronic device 100 may include a power input unit 170, power management module 191, system 101, and battery 180. The system 101 may be other elements of the electronic device 100, except for the battery 180. For example, the system 101 may include one or more of the display unit 110, user input unit 120, sensor unit 130, communication unit 140, storage unit 150, audio unit 160, or processor 190.

The power input unit 170 may be coupled to the power management module 191. The power management module 191 may be coupled to the power input unit 170, system 101, or battery 180. The system 101 may be coupled to the power management module 191. The battery 180 may be coupled to the power management module 191.

The charge control device of the electronic device 100 may detect an abnormal operation of the system 101 through the power management module 191. By way of example, an abnormal operation of the system 101 may occur when the processor 190 is in a lock-up state. The power management module 191 may detect that the electronic device 100 or the processor 190 is in a lock-up state using a watch-dog timer (not shown) included in the power management module 191. When the system 101 is in an abnormal operation state, the power management module 191 may control power supplied through the power input unit 170 or power supplied through the battery 180.

According to aspects of the present disclosure, when the system 101 is in an abnormal operation state, the power management module 191 may block power supplied through the power input unit 170 to be supplied to the battery 180 and the system 101 and control power supplied through the battery 180 to supply to the system 101. According to aspects of the disclosure, when the system 101 is in an abnormal operation state, the power management module 191 may reduce power supplied through the power input unit 170 and power supplied through the battery 180 to a predetermined level.

According to aspects of the present disclosure, the power management module 191 may detect that the system 101 is overheating. When a temperature of the system 101 exceeds a threshold, the power management module 191, according to the present example, may block power supplied through the power input unit 170 to be supplied to the battery 180 and the system 101 and control power supplied through the battery 180 to supply to the system 101. When a temperature of the system 101 increases to a predetermined temperature or more, the power management module 191, according to the present example, may reduce power supplied through the power input unit 170 and power supplied through the battery 180 to a predetermined level.

According to aspects of the disclosure, the power management module 191 may detect a current supplied from the power input unit 170 or a current input and output to and from the battery 180. For example, when a current supplied from the power input unit 170 or a current input and output to and from the battery 180 is greater than or less than a predetermined current level, the power management module 191 may adjust power supplied through the power input unit 170 and power supplied through the battery 180.

The power management module 191, according to aspects of the disclosure, may store current use information on a use situation basis of the electronic device 100 at production operation of the electronic device 100. For example, when the electronic device 100 includes a camera (not shown), the electronic device 100 may determine a current when using the camera to a maximum current of 750 mA. When using the camera, if a current of 750 mA is supplied from the power input unit 170 or the battery 180, the electronic device 100 may control a current supplied from the power input unit 170 or the battery 180. For example, the electronic device 100 may determine a current when using an application (e.g., Internet browser) to a maximum current of 500 mA. When using an application, if a current of 500 mA or more is supplied from the power input unit 170 or the battery 180, the electronic device 100 may control a current supplied from the power input unit 170 or the battery 180.

Figure 4:
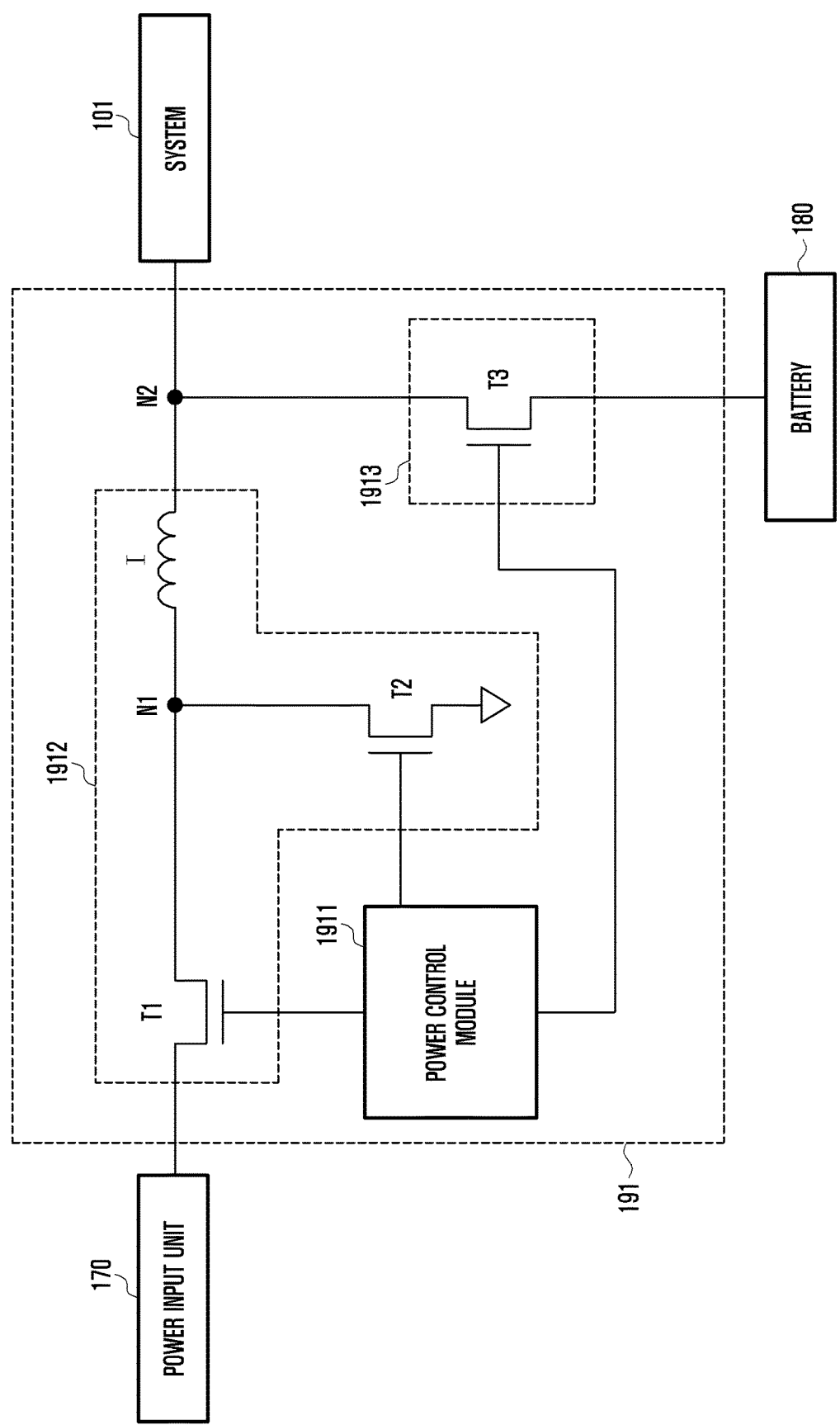
FIG. 4 is a block diagram of another example of an electronic device, according to aspects of the present disclosure.

FIG. 4 is a block diagram of another example of the electronic device 100, according to aspects of the present disclosure.

The charge control device of the electronic device 100 may include a power input unit 170, power management module 191, system 101, and battery 180.

The power input unit 170 may be coupled to the power management module 191. The power management module 191 may be coupled to the power input unit 170, system 101, or battery 180. The system 101 may be coupled to the power management module 191. The battery 180 may be coupled to the power management module 191.

The power management module 191 may include a power control module 1911, first switch unit 1912, or second switch unit 1913. The power control module 1911 may control operation of the first switch unit 1912 or the second switch unit 1913. In some implementations, the power control module 1911 may include a processor, a Field-Programmable Gate Array (FPGA), an Application-Specific Integrated Circuit (ASIC) and/or any other suitable type of processing circuitry. According to aspects of the present disclosure, the power control module 1911 may include a watch-dog timer (not shown) that can detect an abnormal operation of the system 101. According to aspects of the present disclosure, the power control module 1911 may include an element that can detect whether the electronic device 100 or the processor 190 is overheating. According to aspects of the present disclosure, the power control module 1911 may detect a current level of the power input unit 170 or the battery 180 through the first switch unit 1912 or the second switch unit 1913.

The first switch unit 1912 may include a first transistor T1 having one end coupled to the power input unit 170 and the other end coupled to a first node N1 and that receives an input of a signal output from the power control module 1911, a first transistor T2 having one end coupled to the first node N1 and the other end coupled to the ground and that receives an input of a signal output from the power control module 1911, and an inductor I coupled between the first node N1 and a second node N2.

The first switch unit 1912 may adjust or control power output from the power input unit 170 to the system 101 or the battery 180 under the control of the power control module 1911. The first switch unit 1912 may detect a current output from the power input unit 170 to the system 101 or the battery 180.

The second switch unit 1913 may include a third transistor T3 having one end coupled to the battery 180 and the other end coupled to the second node N2 and that receives an input of a signal output from the power control module 1911. The system 101 may be coupled to the second node N2 and receive a supply of power output through the second node N2 and the power input unit 170 or power output through the battery 180.

The second switch unit 1913 may adjust or control power output from the power input unit 170 to the battery 180 under the control of the power control module 1911 or power output from the battery 180 to the system 101. The second switch unit 1913 may detect a current input and output to and from the battery 180.

According to aspects of the present disclosure, as the power control module 1911 controls the first switch unit 1912 or the second switch unit 1913, the electronic device 100 may control power supplied to the system 101 or the battery 180.

For example, when the first to third transistors T1, T2, and T3 are an NMOS transistor, if the power control module 1911 outputs a high signal to the first switch unit 1912 and the second switch unit 1913, the power control module 1911 may supply power to the system 101 or the battery 180 through the power input unit 170. For example, when the first to third transistors T1, T2, and T3 are an NMOS transistor, if the power control module 1911 outputs a low signal to the first switch unit 1912 and outputs a high signal to the second switch unit 1913, power supply to the system 101 or the battery 180 through the power input unit 170 may be blocked. In some aspects, the present disclosure is not limited to a case in which the first to third transistors T1, T2, and T3 are an NMOS transistor, the first to third transistors T1, T2, and T3 may be a PMOS transistor, and the first to third transistors T1, T2, and T3 each may be transistors that form other channels.

According to aspects of the present disclosure, the first to third transistors T1, T2, and T3 may receive the control of a signal output to the power control module 1911 through a gate and have different channel widths according to a signal output to the power control module 1911. For example, the first switch unit 1912 may increase or decrease the power supplied from the power input unit 170 to the system 101 or the battery 180 according to a signal output to the power control module 1911. The second switch unit 1913 may increase or decrease the power supplied from the power input unit 170 to the battery 180 or power supplied from the battery 180 to the system 101 according to a signal output to the power control module 1911.

Figure 5:
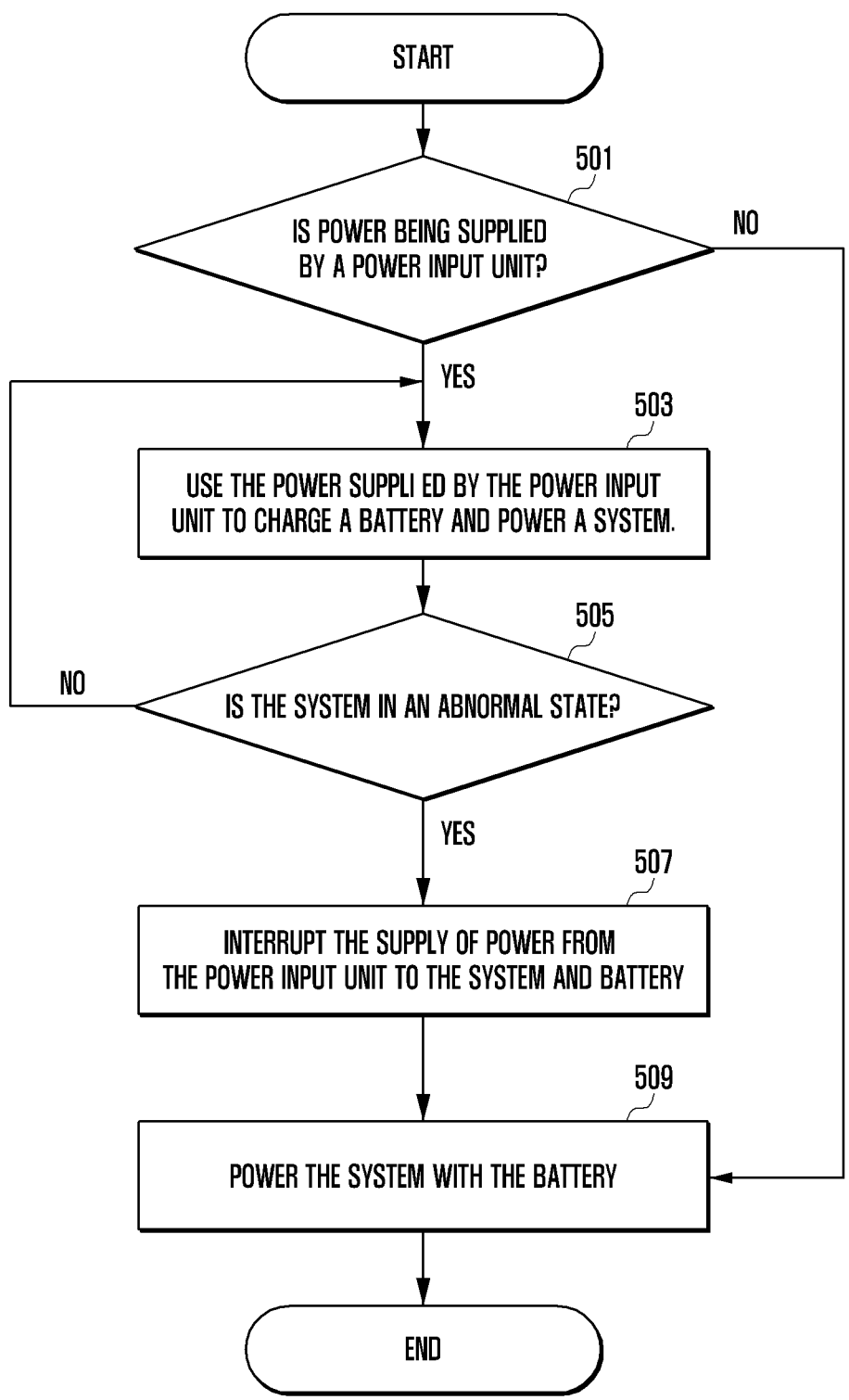
FIG. 5 is a flowchart of an example of a process, according to aspects of the present disclosure.

FIG. 5 is a flowchart of an example of a process, according to aspects of the present disclosure.

According to the process, the electronic device 100 determines whether power is supplied through the power input unit 170 (501). If power is supplied from an external power supply device through the power input unit 170, the electronic device 100 may determine that the electronic device 100 is charging.

If power is not supplied from an external power supply device through the power input unit 170, the electronic device 100 may use the battery 180 to power the system 101 (509).

If the electronic device 100 is charging, the electronic device 100 may supply power to an internal circuit thereof (503). For example, if the electronic device 100 is charging, the power input unit 170 may supply power to the battery 180 and the system 101.

The electronic device 100 may determine whether the system 101 is in an abnormal operation state (505).

If the system 101 is in an abnormal operation state, the electronic device 100 may interrupt the supply of power from the power input unit 170 to the battery 180 and the system 101 (507).

If the system 101 is in a normal operation state, the power input unit may continue to supply power to the battery 180 and the system 101 (503).

The electronic device 100 may control to supply power supplied through the battery 180 to the system 101 (509).

Figure 6:
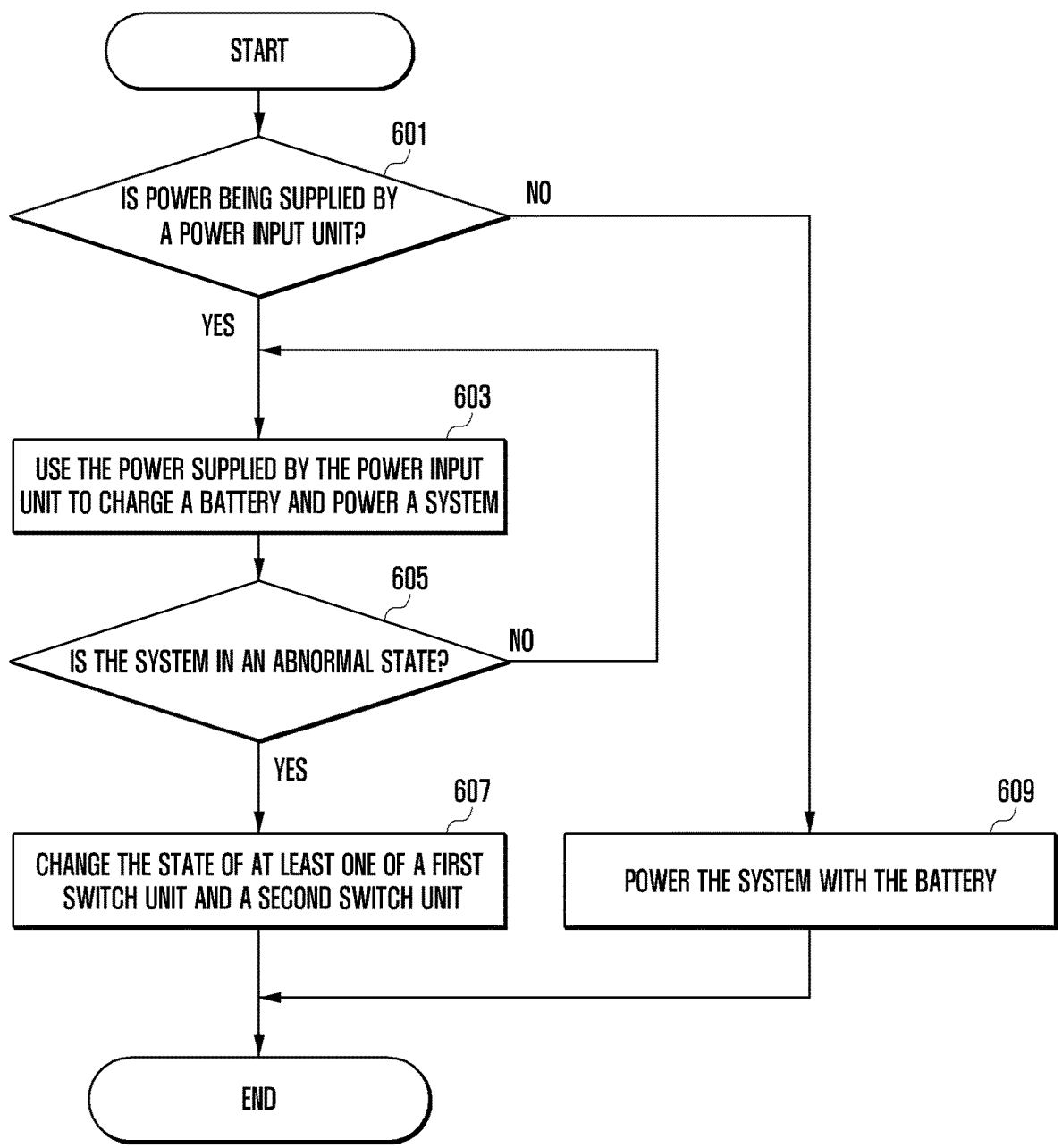
FIG. 6 is a flowchart of an example of a process, according to aspects of the present disclosure.

FIG. 6 is a flowchart of another example of a process, according to aspects of the present disclosure.

According to the process, the electronic device 100 determines whether power is supplied through the power input unit 170 (601). If power is supplied from an external power supply device through the power input unit 170, the electronic device 100 may determine that the electronic device 100 is charging.

If power is not supplied from an external power supply device through the power input unit 170, the electronic device 100 may use the battery 180 to power the system 101 (609).

If the electronic device 100 is charging, the electronic device 100 may supply power to an internal circuit thereof (603). For example, if the electronic device 100 is charging, the electronic device 100 may use the power supplied by the power input unit 170 to charge the battery 180 and power the system 101.

The electronic device 100 may determine whether the system 101 is in an abnormal operation state (605). If the system 101 is in a normal operation state, the electronic device 100 may continue to supply power from the power input unit 170 to the battery 180 and the system 101 (603).

If the system 101 is overheating, i.e., if the system 101 is in an abnormal operation state, the electronic device 100 may change the state of at least one of the first and second switch units 1912 and 1913 (607).

If the system 101 is in an abnormal operation state at operation 605, the electronic device 100 may adjust at least one of the power supplied through the power input unit 170, the power input to the battery 180, and the power output by the battery 180 to the system 101. According to aspects of the present disclosure, if the system 101 is in an abnormal operation state at operation 605, the electronic device 100 may reduce to a predetermined at least one of (i) the power supplied from the battery 180 to the system 101, (ii) the power supplied from the power input unit 170 to the system 101, and (iii) power supplied from the power input unit 170 to the battery 180.

Figure 7:
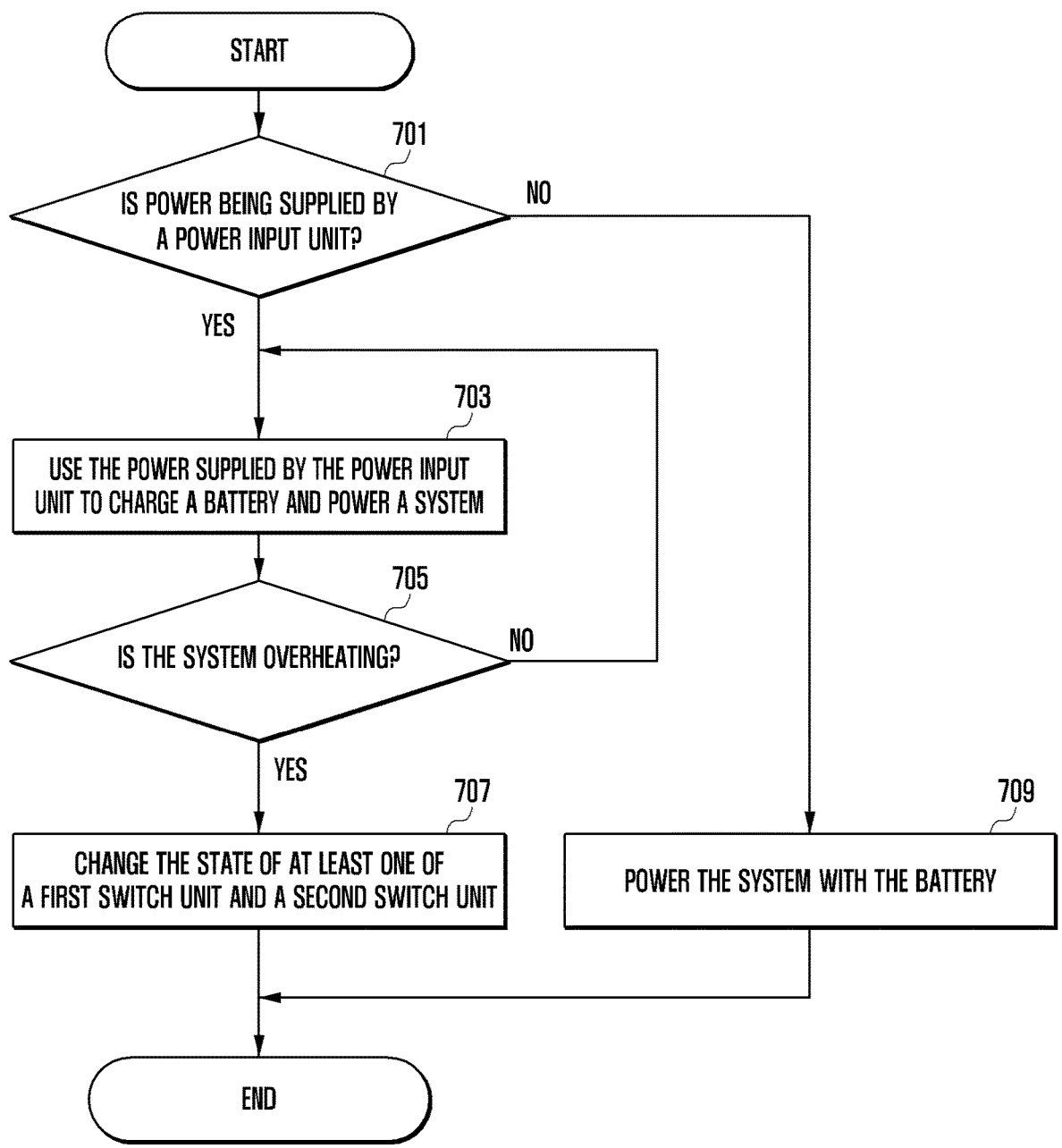
FIG. 7 is a flowchart of an example of a process, according to aspects of the present disclosure.

FIG. 7 is a flowchart of yet another example of a process, according to aspects of the present disclosure.

According to the process, the electronic device 100 determines whether power is supplied through the power input unit 170 (701). If power is supplied from an external power supply device through the power input unit 170, the electronic device 100 may determine that the electronic device 100 is charging.

If power is not supplied from the external power supply device through the power input unit 170, the electronic device 100 may use the battery 180 to power the system 101 (709).

If the electronic device 100 is charging, the electronic device 100 may supply power to an internal circuit thereof (703). For example, if the electronic device 100 is charging, the electronic device 100 may use the power supplied by the power input unit 170 to charge the battery 180 and power the system 101.

The electronic device 100 may determine whether the system is overheating (705). If the system is not overheating, the electronic device 100 may continue to use the power supplied by the power input unit 170 to charge the battery 180 and power the system 101 (703).

If the system 101 is overheating, the electronic device 100 may change the state of at least one of the first and second switch units 1912 and 1913 (707).

According to aspects of the present disclosure, if the system 101 is overheating, the electronic device 100 may adjust at least one of (i) the power supplied from the battery 180 to the system 101, (ii) the power supplied from the power input unit 170 to the system 101, and (iii) power supplied from the power input unit 170 to the battery 180. For example, if the system 101 is overheating, the electronic device 100 may reduce at least one of (i) the power supplied from the battery 180 to the system 101, (ii) the power supplied from the power input unit 170 to the system 101, and (iii) power supplied from the power input unit 170 to the battery 180.

Figure 8:
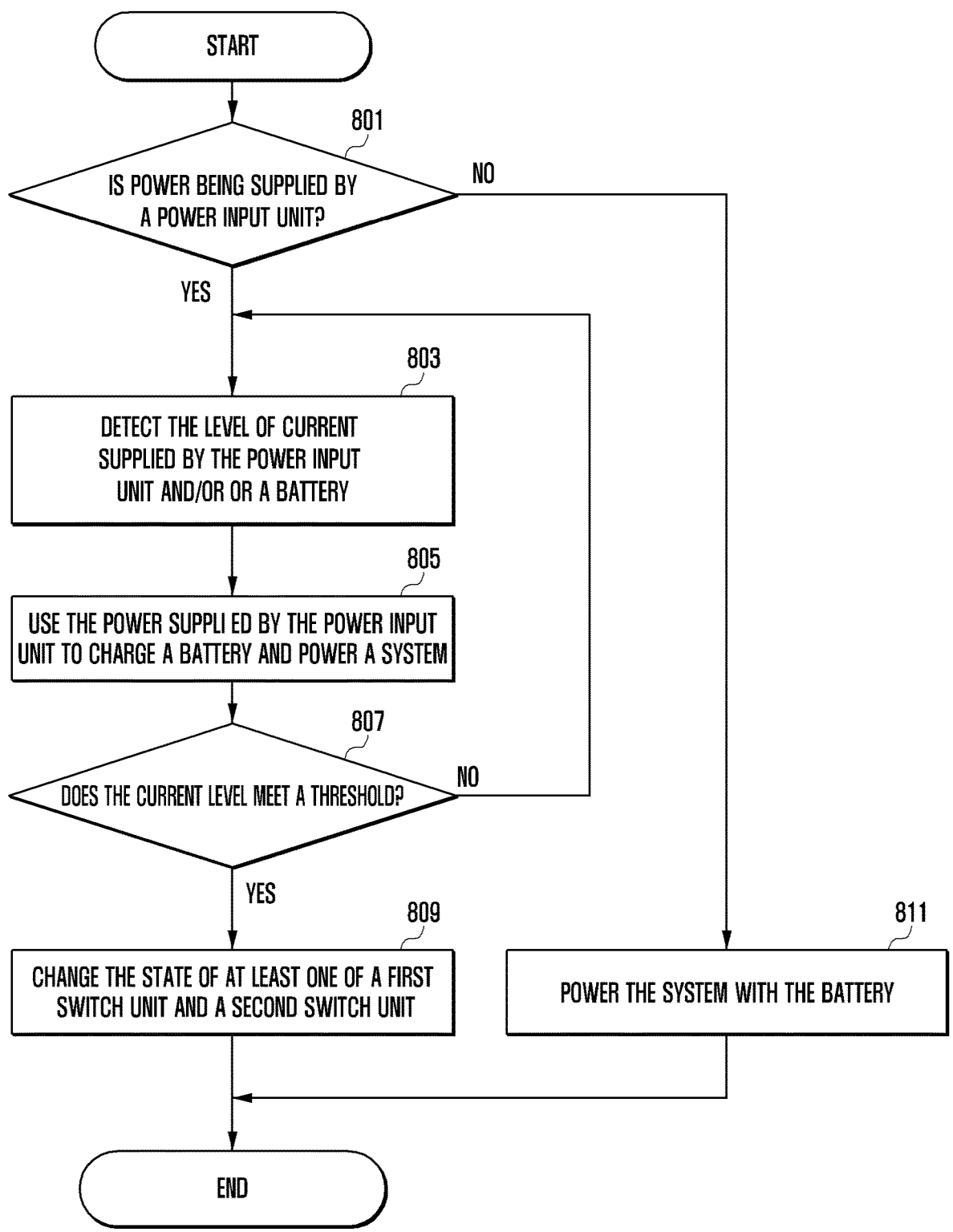
FIG. 8 is a flowchart of an example of a process, according to aspects of the present disclosure.

FIG. 8 is a flowchart of yet another example of a process, according to aspects of the present disclosure.

According to the process, the electronic device 100 determines whether power is supplied through the power input unit 170 (801). If power is supplied from an external power supply device through the power input unit 170, the electronic device 100 may determine that the electronic device 100 is charging.

If power is not supplied from an external power supply device through the power input unit 170, the electronic device 100 may use the battery 180 to power the system 101 (811).

The electronic device 100 may detect a current supplied from the power input unit 170 or a current input and output to and from the battery 180 (803). At operation 803, the electronic device 100 may detect the level of current supplied from the power input unit 170 or the battery 180, through the first switch unit 1912 or the second switch unit 1913.

If the electronic device 100 is charging, the electronic device 100 may supply power to an internal circuit thereof (805). For example, at operation 805, if the electronic device 100 is charging, the electronic device 100 may the power supplied by the power input unit 170 to charge the battery 180 and power the system 101.

The electronic device 100 may determine whether a given current level meets (e.g., exceeds or falls below) a threshold. The given current level may include at least one of: (i) the level of current supplied from the battery 180 to the system 101, (ii) the level of current supplied from the power input unit 170 to the system 101, and (iii) level of current supplied from the power input unit 170 to the battery 180 (807). For instance, at operation 807, the electronic device 100 may determine whether a current supplied from the power input unit 170 or a current input and output to and from the battery 180 is greater than or smaller than a predetermined current. As another example, at operation 807, the electronic device 100 may determine whether a current supplied from the power input unit 170 or a current input and output to and from the battery 180 through the first switch unit 1912 or the second switch unit 1913 is excessively high or low.

If the threshold is met, the electronic device 100 may change the state of at least one of the first and second switch units 1912 and 1913 (809).

According to aspects of the present disclosure, if the level of current supplied from the power input unit 170 or current input and output to and from the battery 180 through the first switch unit 1912 or the second switch unit 1913 exceeds (or falls below) the threshold, the electronic device 100 may adjust at least one of: at least one of (i) the power supplied from the battery 180 to the system 101, (ii) the power supplied from the power input unit 170 to the system 101, and (iii) power supplied from the power input unit 170 to the battery 180. According to aspects of the present disclosure, at operation 809, the electronic device 100 may reduce at least one of: (i) the power supplied from the battery 180 to the system 101, (ii) the power supplied from the power input unit 170 to the system 101, and (iii) power supplied from the power input unit 170 to the battery 180.

As described above, according to aspects of the present disclosure, in a method and apparatus for controlling charge of an electronic device, and the electronic device including the same, by controlling power supplied to the electronic device by detecting the occurrence of an overheating condition and/or abnormal operation while charging the electronic device, stable power can be supplied to the electronic device.

Further, by controlling power supplied to the electronic device by detecting an exothermic phenomenon or an abnormal operation occurring while charging the electronic device, an internal circuit or an internal device of the electronic device can be protected from overheating.

FIGS. 1-8 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An electronic device comprising:
    a touch screen;
    a communication circuitry;
    a memory;
    a battery;
    a power input unit;
    a watch-dog timer; and
    at least one processor configured to:
    control the power input unit to supply power to the battery, the touch screen and the communication circuitry in a normal operation state;
    control the battery to supply the power to the touch screen and the communication circuitry in an abnormal operation state;
    control the watch-dog timer to monitor whether the at least one processor identifies data within a predetermined time;
    when the at least one processor does not identity the data within the predetermined time, control the watch-dog timer to determine that the at least one processor is in the abnormal operation state; and
    in response to determining that the at least one processor is in the abnormal operation state, control the power input unit to block power supplied to the battery, the touch screen and the communication circuitry.

2. The electronic device of claim 1, wherein the data comprises a register bit.

3. The electronic device of claim 1, wherein the at least one processor is further configured to:
    when the at least one processor identifies the data within the predetermined time, control the watch-dog timer to determine that the at least one processor is in the normal operation state.

4. The electronic device of claim 1, wherein the at least one processor is further configured to:
    control the watch-dog timer to detect whether the at least one processor is in a lock-up state; and
    when the at least one processor is in the lock-up state, control the watch-dog timer to determine that the at least one processor is in the abnormal operation state.

5. The electronic device of claim 1, wherein the at least one processor is further configured to:
    control the watch-dog timer to monitor whether the at least one processor terminates a processing within the predetermined time; and
    when the at least one processor does not terminate the processing within the predetermined time, control the watch-dog timer to determine that the at least one processor is in the abnormal operation state.

6. The electronic device of claim 1, wherein the at least one processor is further configured to:
    control the battery to store the power or supply the power to the touch screen and the communication circuitry.

7. The electronic device of claim 1, wherein the at least one processor is further configured to:
    control the power input unit to supply the power to the battery, the touch screen and the communication circuitry from an external power supply device.

8. The electronic device of claim 1, further comprising:
    a first switch connected between the power input unit and a system;
    a second switch connected between the battery and a point where the first switch and the system are connected; and
    wherein the at least one processor is further configured to control operation of the first switch and the second switch, and
    wherein the system includes at least one of the touch screen, the communication circuitry, the memory and the at least one processor.

9. The electronic device of claim 8, wherein the at least one processor is configured to:
    in response to determining that the at least one processor is in the abnormal operation state, control the first switch to block power supplied to the system and the battery through the power input unit, and control the second switch to supply the power to the system through the battery.

10. A method comprising:
    controlling a power input unit to supply power to a battery, a touch screen and a communication circuitry in a normal operation state;
    controlling the battery to supply the power to the touch screen and the communication circuitry in an abnormal operation state;
    controlling a watch-dog timer to monitor whether at least one processor identifies data within a predetermined time;
    determining, via the watch-dog timer, when the at least one processor does not identify the data within the predetermined time, that the at least one processor is in the abnormal operation state; and
    in response to determining that the at least one processor is in the abnormal operation state, controlling the power input unit to block power supplied to the battery, the touch screen, and the communication circuitry.

11. The method of claim 10, wherein the data comprises a register bit.

12. The method of claim 10, further comprising:
    determining, via the watch-dog timer, when the at least one processor identifies the data within the predetermined time, that the at least one processor is in the normal operation state.

13. The method of claim 10, further comprising:
    controlling the watch-dog timer to detect whether the at least one processor is in a lock-up state; and
    determining, via the watch-dog timer, when the at least one processor is in the lock-up state, that the at least one processor is in the abnormal operation state.

14. The method of claim 10, further comprising:
    controlling the watch-dog timer to monitor whether the at least one processor terminates a processing within the predetermined time; and
    determining, via the watch-dog timer, when the at least one processor does not terminate the processing within the predetermined time, that the at least one processor is in the abnormal operation state.

15. The method of claim 10, further comprising:
controlling the battery to store the power or supply the power to the touch screen and the communication circuitry.

16. The method of claim 10, further comprising:
controlling the power input unit to supply the power to the battery, the touch screen and the communication circuitry from an external power supply device.

17. The method of claim 10, further comprising:
in response to determining that the at least one processor is in the abnormal operation state, controlling a first switch to block power supplied to a system and the battery through the power input unit, and controlling to a second switch to supply the power to the system through the battery,
wherein the system includes at least one of the touch screen, the communication circuitry, a memory, and the at least one processor,
wherein the first switch is connected between the power input unit and the system;
wherein the second switch is connected between the battery and a point where the first switch and the system are connected; and
wherein the at least one processor is further configured to control operation of the first switch and the second switch.

\* \* \* \* \*